United States Patent [19]

Greenlee

[11] 3,754,969

[45] Aug. 28, 1973

[54] METHOD OF ADHERING ROOM TEMPERATURE VULCANIZABLE SILICONE RUBBER TO METAL SURFACES

[75] Inventor: Thomas W. Greenlee, Midland, Mich.

[73] Assignee: Dow Corning Corporation, Midland, Mich.

[22] Filed: June 18, 1971

[21] Appl. No.: 154,644

[52] U.S. Cl. ............................ 117/49, 117/132 BS
[51] Int. Cl. ........................ B44d 1/40, B32b 15/08
[58] Field of Search ...................... 117/49, 132 BS; 156/2; 134/2, 3, 40, 41

[56] References Cited
UNITED STATES PATENTS

| | | | |
|---|---|---|---|
| 3,591,432 | 7/1971 | Vazirani | 117/49 X |
| 2,302,939 | 11/1942 | DeLong | 134/41 X |
| 3,070,464 | 12/1962 | Levy | 134/41 |
| 3,065,194 | 11/1962 | Nitzsche et al. | 260/37 |
| 2,999,077 | 9/1961 | Nitzsche et al. | 260/18 |
| 3,127,363 | 3/1964 | Nitzche et al | 260/18 |
| 2,516,008 | 7/1950 | Lum | 134/41 UX |
| 3,470,056 | 9/1969 | Hook | 117/49 X |
| 3,166,444 | 1/1965 | Ehren et al. | 117/49 X |
| 2,318,559 | 5/1943 | Percival | 134/3 UX |
| 3,507,795 | 4/1970 | Gardner | 134/3 X |

OTHER PUBLICATIONS

Burns et al., Protective Coatings for Metals, pps. 22, 23, 425, 427 (1955).

*Primary Examiner*—William D. Martin
*Assistant Examiner*—Harry J. Gwinnell
*Attorney*—Robert F. Fleming, Jr. et al.

[57] ABSTRACT

The adhesion to metal surfaces of room temperature vulcanizable silicone rubber curable through condensation of silicon-bonded hydroxyls with silicon-bonded alkoxy radicals or silicon-bonded hydrogen atoms is improved by contacting the metal surface with acetic acid, formic acid, propionic acid, butyric acid, benzoic acid, toluic acid, metal salts thereof and ammonium salts thereof, removing any excess acid or salt from the surface along with any extraneous materials formed during the contacting, drying the surface and thereafter applying the room temperature vulcanizable silicone rubber to the treated surface and allowing it to cure.

9 Claims, No Drawings

METHOD OF ADHERING ROOM TEMPERATURE VULCANIZABLE SILICONE RUBBER TO METAL SURFACES

This invention relates to a method of improving the adhesion of a room temperature vulcanizable silicone rubber to a metal surface.

The adhesion of silicone rubber to metal surfaces and particularly certain silicone rubbers is a problem which has received considerable attention in the prior art. In 1944, a method was described in U.S. Pat. No. 2,354,011 which applied a layer of insoluble heavy metal salts of aliphatic fatty acids to metal surfaces to which an organic rubber was to be bonded. Metal salts of fatty acids usually act as release agents for silicone rubber and thus a number of other methods for adhering silicone rubber to metals have been developed. The methods known in the art to adhere silicone rubber to metal surfaces involve the application of an adhesive composition, a primer and the like, such that the silicone rubber bonds to another surface instead of a metal surface.

An object of the present invention is to bond silicone rubber, particularly room temperature vulcanizable, to metal surfaces without using an intervening layer of primer or adhesive. This object and others will become more apparent from the following detailed description of the present invention.

This invention relates to a method of improving the adhesion of room temperature vulcanizable silicone rubber to a metal surface comprising contacting a metal surface with a compound selected from the group consisting of acetic acid, formic acid, propionic acid, butyric acid, benzoic acid, toluic acid, soluble metal salts thereof and soluble ammonium salts thereof, removing from the metal surface any excess compound and any extraneous materials formed by contacting the metal surface with the compound, exposing the metal surface to a drying atmosphere for at least 30 minutes wherein a treated metal surface is obtained, applying to the treated metal surface a room temperature vulcanizable silicone rubber consisting essentially of a hydroxyl endblocked polydiorganosiloxane having a viscosity of from 1,000 to 100,000 cs. at 25°C. and having organic radicals selected from the group consisting of methyl, ethyl, phenyl and 3,3,3-trifluoropropyl wherein at least 50 percent of the organic radicals are methyl radicals, a crosslinking agent selected from the group consisting of alkoxysilicon compounds and organohydrogensiloxanes and a curing catalyst, allowing the room temperature vulcanizable silicone rubber to cure whereby the adhesion of the room temperature vulcanizable silicone rubber to the treated metal surface is increased compared to the adhesion of the same room temperature vulcanizable silicone rubber applied to an untreated metal surface.

The adhesion of room temperature vulcanizable silicone rubber to a metal surface is improved by first contacting the metal surface with acetic acid, formic acid, propionic acid, butyric acid, benzoic acid, soluble metal salts of these acids and soluble ammonium salts of these acids. These acids and the soluble salts are well known in the art. The soluble metal salts and soluble ammonium salts of these acids are soluble in water or convenient organic solvents. For the purpose of the present invention, soluble means greater than 0.1 weight percent solute in the solvent. Convenient organic solvents are any of those which are readily available and are not damaging to metal surfaces. Such organic solvents include, benzene, toluene, methanol, ethanol, isopropanol, acetone, diethylether and the like. The soluble metal salts can be illustrated by sodium formate, sodium acetate, sodium propionate, sodium benzoate, sodium toluate, sodium butyrate, sodium isobutyrate, zinc formate, zinc acetate, zinc benzoate, zinc propionate, zinc butyrate, zinc isobutyrate, throium formate, stannous formate, stannous acetate, stannous propionate, stannous butyrate, stannous isobutyrate, barium formate, barium acetate, barium propionate, barium butyrate, barium isobutyrate, barium benzoate, calcium formate, calcium acetate, calcium propionate, calcium benzoate, calcium butyrate, calcium isobutyrate, thallium I formate, thallium I acetate, thallium I propionate, thallium I butyrate, potassium formate, potassium acetate, potassium propionate, potassium benzoate, potassium butyrate, potassium isobutyrate, potassium toluate, chromium III acetate, nickel II formate, nickel II acetate, strontium formate, strontium acetate, strontium propionate, strontium butyrate, strontium isobutyrate, lithium formate, lithium acetate, lithium propionate, lithium benzoate, cadmium formate, cadmium acetate, cadmium propionate, cadmium butyrate, cadmium benzoate, cobalt II formate, cobalt II acetate, cobalt III acetate, cobalt II propionate, cobalt II benzoate, mercury I formate, mercury I acetate, mercury II acetate, mercury II benzoate, mercury I propionate, mercury II propionate, manganese II formate, manganese II acetate, manganese II propionate, manganese II butyrate, manganese II benzoate, cesium formate, cesium acetate, cesium benzoate, ferric formate, ferric acetate, ferrous acetate, ferric benzoates, cerium III formate, cerium III acetate, cerium III propionate, cerium III butyrate, cerium III isobutyrate, lead II formate, lead II acetate, lead II propionate, lead II butyrate, lead II isobutyrate, magnesium formate, magnesium acetate, magnesium propionate, magnesium butyrate, magnesium isobutyrate, and magnesium benzoate. The soluble ammonium salts can be illustrated by ammonum formate, ammonium acetate, ammonium propionate, ammonium butyrate, ammonium isobutyrate and ammonium benzoate.

The metal surface can be metals such as iron, steel, stainless steel, aluminum, titanium, tin and alloys thereof.

The metal surface can be contacted by any of the acids, metal salts or ammonium salts in a solid, liquid or gaseous state, preferably a liquid or gaseous state is used. The liquid state refers to the acids, metal salts or ammonium salts in their fluid state such as the acids, metal salts or ammonium salts in their molten state, aqueous solutions of the acids, metal salts or ammonium salts and organic solvent solutions of the acids, metal salts or ammonium salts. The gaseous state refers to any of the acids which can be vaporized under suitable conditions. The gaseous state is not intended to include vaporized metal salts or ammonium salts since most salts will decompose before vaporizing and thus a metal surface would not be contacted by a metal salt or an ammonium salt. The metal surface is preferably contacted with an acid, a metal salt or an ammonium salt in the liquid state, since either the solid or gaseous states are difficult to use and are generally more expensive. The aqueous solutions of the acids, metal salts and ammonium salts are convenient, readily available, safe to use and are totally effective. The organic solvent solutions are particularly suitable for salts which are not readily soluble in water and are more soluble in the organic solvent. The organic solvents which are particularly suitable are methanol, ethanol, isopropanol, acetone, diethylether, benzene, toluene and the like.

Any method of contacting the metal surface with the acid or salts can be used so long as an intimate contact is accomplished. The liquid state thus provides the most readily available form for contacting the metal surfaces to provide an intimate contact by the acids or salts. The metal surface is preferably immersed in the liquid acids or salts. Other methods which are suitable include methods such as allowing the liquid to pass over the metal surface, wetting a sponge or cloth with a liquid acid or salt and contacting the surface with the wet applicator and the like, but these methods are less desirable. The time of contact can be very short such as one minute to long periods of time such as 64 hours or longer, preferably the contact time is from 1 to 24 hours. The temperature of the contacting acid or salt is not narrowly critical, except that temperatures which decompose the salts and acids should not be used. Preferably, the temperature of the contacting acid or salt is less than 100°C. and conveniently the temperature is ambient temperature. Where a gaseous state is used to contact the metal surface with acid, the metal surface is brought into contact with the acid vapors, such as acetic acid vapors, for a suitable contact time.

After the metal surface has been contacted with the acid, metal salt or ammonium salt for a suitable time, the remaining acid or salt along with any extraneous materials which may form from such contact which are on the metal surface are removed. The removal can be accomplished in a number of ways, such as by allowing those materials which evaporate to do so, rinsing the metal surface with water, or rinsing the metal surface with an organic solvent. The type of rinse is dependent upon the particular salts or acids used and their solubilities in water and organic solvent. If a salt, for example, is more soluble in an organic solvent than water, the rinse would preferably be an organic solvent whereas if a particular salt is more soluble in water than an organic solvent, the rinse would preferably be water. Where the rinse is water, the metal surface is preferably further rinsed with a volatile organic solvent, to provide a quicker drying surface.

After the removal of the salts or acids from the metal surface, the metal surface is exposed to a drying atmosphere for at least 30 minutes wherein a treated metal surface is obtained. The drying atmosphere can be atmospheric air, nitrogen, a vacuum or the like. The drying atmosphere can be at ambient temperature or higher, such as up to 75° or 100°C. The metal surface can be exposed to the drying atmosphere for long periods of times, such as up to 10 days. without effecting the ultimate adhesion of the room temperature vulcanizable silicone rubber to the metal surface.

To the treated metal surface, a room temperature vulcanizable silicone rubber is applied. The particular room temperature vulcanizable silicone rubber is limited to two types, as related to the cure system. One curve system involves an alkoxy bonded to silicon and a hydroxyl bonded to silicon and the other cure system involves a hydrogen atom bonded to silicon and a hydroxyl bonded to silicon. Both systems usually involve a curing catalyst as well. These room temperature vulcanizable silicone rubbers are well known in the art and are available commercially. These room temperature vulcanizable silicone rubbers are known to possess a very low affinity for bonding to metal surfaces and therefore it is important to improve the adhesion to metal surfaces to broaden their utility. The elimination of adhesive compositions and primers can also be accomplished by treating the metal surface in accordance with this invention. Although the improvement in adhesive bone strength is not always an ultimate value, completely cohesive, sufficient enhancement of the adhesive bond strength is realized to make these room temperature vulcanizable silicone rubbers useful where adhesion to metal surfaces is needed.

The room temperature vulcanizable silicone rubbers consist essentially of a hydroxyl endblocked polydiorganosiloxane having a viscosity of from 1,000 to 100,000 cs. at 25°C., preferably from 1,000 to 50,000 cs. at 25°C. The organic radicals of the polydiorganosiloxane can be methyl, ethyl, phenyl and 3,3,3-trifluoropropyl where at least 50 percent of the organic radicals are methyl radicals. The hydroxyl endblocked polydiorganosiloxanes can be illustrated by polydimethylsiloxane, polymethyl-3,3,3-trifluoropropylsiloxane, polyethylmethylsiloxane, polydiethylsiloxane and polydiorganosiloxanes, which are copolymers of two or more units of dimethylsiloxane units, diphenylsiloxane units, methylphenylsiloxane units, diethylsiloxane units and 3,3,3-trifluoropropylmethylsiloxane units. Mixtures and blends of polydiorganosiloxanes can also be used.

The crosslinking agent can be an alkoxy silicon compound or an organohydrogensiloxane. The alkoxy silicon compounds can be illustrated by orthosilicates such as ethylorthosilicate, n-propylorthosilicate, amylorthosilicate, pentenylorthosilicate, diethyldipropylorthosilicate and hexylorthosilicate; alkylpolysilicates such as methylpolysilicate, ethylpolysilicate, isopropylpolysilicate, n-propylpolysilicate, secondary amylpolysilicate and n-butylpolysilicate; monoorganotrialkoxysilanes such as methyltrimethoxysilane, ethyltriethoxysilane, propyltrimethoxysilane, methyltriisopropoxysilane, phenyltrimethoxysilane, vinyltrimethoxysilane, methyltriamyloxysilane and phenyltributoxysilane; and other alkoxysilicon compounds such as $Si(OCH_2CH_2OCH_3)_4$, $Si(OCH_2CH_2OCH_2CH_3)_4$, $C_6H_5Si(OCH_2CH_2OCH_3)_3$, $CF_3CH_2CH_2Si(OCH_2CH_2OCH_3)_3$ and the like.

The organohydrogensiloxane crosslinking agents can be illustrated by $[(CH_3)HSiO]_4$, copolymers containing $(CH_3)HSiO$ units such as copolymers of dimethylsiloxane units and methylhydrogensiloxane endblocked with trimethylsiloxane units or dimethylhydrogensiloxane units, methylhydrogenpolysiloxanes, and other SiH containing siloxanes as are well known in the art.

The curing catalyst can be illustrated by metal salts of carboxylic acids such as lead naphthenate, cobalt naphthenate, zinc naphthenate, sodium naphthenate, iron 2-ethylhexoate, lead 2-ethylhexoate, chromium octoate, dibutyltin dibenzoate, dibutyltin adipate, lead sebacate, dibutyltin dilactate, dibutyltin diacetate, dibutyltin dilaurate, lead octoate, tin ricinoleate, cobalt hexoate, aluminum acetyl acetonate, zirconium acetoacetate, dioctyltindimaleinate, other catalysts are known and include such compounds as amines and amine salts.

Tha above room temperature vulcanizable silicone rubbers are well known in the art and are available commercially. The room temperature vulcanizable silicone rubbers which comprise a hydroxyl endblocked polydiorganosiloxane, and alkoxysilicon compound and a curing catalyst are further defined in the following patents with respect to ingredients, amounts and methods of preparation. The following patents are hereby incorporated by reference and include U.S. Pat. No. 2,843,555 by Berridge, U.S. Pat. No. 2,902,467 by Chipman, U.S. Pat. No. 2,927,907 by Polmanteer, U.S. Pat. No. 3,065,194 by Nitzsche et al., U.S. Pat. No. 3,070,559 by Nitzsche et al., U.S. Pat. No. 3,070,566 by Nitzsche et al., U.S. Pat. No. 3,127,363 by Nitzsche et al. and U.S. Pat. No. 3,305,502 by Lampe. The room temperature vulcanizable silicone rubbers which comprise a hydroxyl endblocked polydiorganosiloxane, an organohydrogensiloxane and a curing catalyst are further defined in the following patents with respect to ingredients, amounts and methods of preparation. The following patents are hereby incorporated by reference and include U.S. Pat. No. 2,999,077 by Nitzsche et al., U.S. Pat. No. 3,070,559 by Nitzsche et al., U.S. Pat. No. 3,070,566 by Nitzsche et al. and U.S. Pat. No. 3,127,363 by Nitzsche et al.

The room temperature vulcanizable silicone rubbers can also contain any of the fillers and additives which are well known and described in the prior art.

After the room temperature vulcanizable silicone rubber is applied to the treated metal surface, it is allowed to cure. Since these silicone rubbers vulcanize when mixed at room temperature additional curing procedures are not required. However, one can increase the temperature to shorten the curing time, but this is not necessary since these silicone rubbers usually set up within a few hours. After the room temperature vulcanizable silicone rubber cures, the adhesion to the metal surface is improved compared to the same silicone rubber in combination with an untreated metal surface.

The following examples are illustrative only and should not be construed as limiting the present invention which is properly delineated in the claims.

EXAMPLE 1

Aluminum panels and foil were intially cleaned by immersing and rubbing with paper wipers first under trichloroethylene and then under methyl isobutyl ketone. The cleaned aluminum substrates were allowed to dry and then immersed in the treating agent for the times specified in Table I. The treated aluminum substrates were rinsed as indicated in Table I and where no rinsing is indicated the treating agent was volatile enough and the treated aluminum substrates were allowed to dry by evaporation. In Run No. 8, the aluminum substrates were placed in a closed vessel containing air saturated with acetic acid for the time specified. After the treated aluminum substrates were dried after the rinse or evaporation, the room temperature vulcanizable silicone rubber was applied with a spatula to the treated aluminum foil strips measuring 10 inches by 1 inch by 0.004 inch. These foil strips were applied to a treated aluminum panel (6 inches by 4 inches by 1/16 inch) having a 4 inch width with the rubber side of the foil strip to the aluminum panel and then rolled with a 10 pound hand roller to provide a thickness of 5 to 8 mils for the room temperature vulcanizable silicone rubber. The test assembly was then allowed to cure at ambient conditions one week before adhesion tests were made. Adhesion tests were also done on identical samples after curing for one month. The adhesion was determined by using conventional test equipment for the 180° peel test at 2 inches per minute jaw separation rate. The adhesion results were as shown in Table I.

The room temperature vulcanizable silicone rubber was prepared by thoroughly mixing the following ingredients: 100 parts by weight of a hydroxyl endblocked polydimethylsiloxane fluid having a viscosity of about 12,500 cs. at 25°C., 30 parts by weight of a trimethylsiloxy treated fume silica filler, 4 parts by weight of n-propylorthosilicate and 0.3 part by weight of dibutyltin diacetate.

TABLE I

| Run No. | Treatment | Time of Treatment | Adhesion, Peel, pounds per linear inch | |
|---|---|---|---|---|
| | | | After 1 week | After 1 month |
| 1. | None (Control)* | — | 2–5 | 2–6 |
| 2. | Water* | 16 hours | 6 | 7 |
| 3. | Isopropanol* | 64 hours | 6 | 6 |
| 4. | Toluene* | 16 hours | 3 | 6 |
| 5. | Acetic acid, glacial | 1 hour | 18 | 21 |
| 6. | Acetic acid, glacial | 16 hours | 22 | 26 |
| 7. | 5 weight percent acetic acid in toluene | 16 hours | 14 | 19 |
| 8. | Acetic acid vapor | 64 hours | 9 | 17 |
| 9. | Formic acid, pure | 64 hours | 5 | 17 |
| 10. | Propionic acid, pure | 16 hours | 26 | 20 |
| 11. | 5 weight percent benzoic acid in toluene, rinsed with toluene | 16 hours | 19 | 12 |
| 12. | 0.54 weight percent sodium acetate in isopropanol, rinsed with isopropanol | 1 minute | 9 | 19 |
| 13. | 0.54 weight percent sodium acetate in isopropanol, rinsed with isopropanol | 7 hours | 10 | 16 |
| 14. | 2 weight percent ammonium acetate in isopropanol, rinsed with ispropanol | 16 hours | 18 | 22 |
| 15. | 0.01 weight percent calcium acetate monohydrate in isopropanol, rinsed with isopropanol | 16 hours | 9 | 17 |
| 16. | 2 weight percent sodium acetate in water, rinsed with water | 16 hours | 10 | 18 |
| 17. | Acetic acid, glacial followed by water for 1 hour | 16 hours | 22 | 19 |

* For comparative purposes

EXAMPLE 2

The room temperature vulcanizable silicone rubber as defined in Example 1 was applied to titanium alloy panels and stainless steel panels and tested for adhesion by the conventional lap-shear test after the panels were treated as defined in Table II by the method defined in Example 1. The results were as recorded in Table II.

TABLE II

| Substrate | Treatment | Adhesion, lap-shear, psi. | |
|---|---|---|---|
| | | After 1 week | After 1 month |
| Titanium Alloy | None (Control)* | 155 | 244 |
| Titanium Alloy | Acetic Acid, Glacial, 16 hours | 255 | 309 |
| Stainless Steel | None (Control)* | 34 | 79 |
| Stainless Steel | Acetic Acid, Glacial, | 62 | 212 |

* For comparative purposes

EXAMPLE 3

The treatment procedure as defined in Example 1 was used where the treatment time was 16 hours at room temperature. The adhesion was determined as defined in Example 1. The room temperature vulcanizable silicone rubber was prepared by thoroughly mixing 100 parts by weight of a hydroxyl endblocked polydimethylsiloxane having a viscosity of about 12,500 cs. at 25°C., 30 parts by weight of the fumed silica filler as defined in Example 1, 0.5 part by weight of a trimethylsiloxy endblocked polymethylhydrogensiloxane having a molecular weight of about 2200, and 0.5 part by weight of dibutyltindiacetate. The adhesion results were as shown in Table III.

TABLE III

| Treatment | Adhesion, after 1 week | Peel, pounds per linear inch after 1 month |
|---|---|---|
| None (Control)* Glacial | 0.4 | 7 |
| Acetic Acid, Glacial | 10 | 44 |
| 0.54 weight percent sodium acetate in isopropanol rinsed with isopropanol | 6 | 10 |

* For comparative purposes

EXAMPLE 4

When any one of the following salts in solution replace the treatments in Example 1, improved adhesion over the control is realized: sodium formate, sodium benzoate, sodium butyrate, zinc acetate, zinc isobutyrate, stannous acetate, barium acetate, calcium benzoate, thallium I propionate, potassium acetate, nickel II formate, strontium propionate, lithium acetate, cadmium acetate, cobalt III acetate, manganese II formate, cesium acetate, ferric benzoate, cerium III isobutyrate, lead II acetate, magnesium acetate and ammonium propionate.

That which is claimed is:

1. A method of improving the adhesion of room temperature vulcanizable silicone rubber to a metal surface consisting essentially of contacting a cleaned metal surface wherein said metal is selected from the group consisting of iron, steel, stainless steel, aluminum, titanium, tin and alloys thereof, with a compound selected from the group consisting of acetic acid, formic acid, propionic acid, butyric acid, benzoic acid, toluic acid, soluble metal salts thereof and soluble ammonium salts thereof, removing from the metal surface any excess compound and any extraneous materials formed by contacting the metal surface with the compounds, exposing the metal surface to a drying atmosphere for at least 30 minutes wherein a treated metal surface is obtained, applying to the treated metal surface a room temperature vulcanizable silicone rubber consisting essentially of a hydroxyl endblocked polydiorganosiloxane having a viscosity of from 1,000 to 100,000 cs. at 25°C. and having organic radicals selected from the group consisting of methyl, ethyl, phenyl and 3,3,3-trifluoropropyl wherein at least 50 percent of the organic radicals are methyl radicals, a crosslinking agent selected from the group consisting of alkoxysilicon compounds and organohydrogensiloxanes and a curing catalyst, allowing the room temperature vulcanizable silicone rubber to cure whereby the adhesion of the room temperature vulcanizable silicone rubber to the treated metal surface is increased compared to the adhesion of the same room temperature vulcanizable silicone rubber applied to an untreated metal surface.

2. The method in accordance with claim 1 wherein the compound is in a liquid state when contacting the metal surface.

3. The method in accordance with claim 2 wherein the liquid state is an aqueous solution.

4. The method in accordance with claim 2 wherein the liquid state is an organic solvent solution.

5. The method in accordance with claim 2 wherein the metal surface contacted with the compound is rinsed with an organic solvent to remove from the metal surface any excess compound and any extraneous materials formed by contacting the metal surface with the compound.

6. The method in accordance with claim 2 in which the compound is acetic acid.

7. The method in accordance with claim 1 in which metal of the soluble metal salts is selected from the group consisting of Group I metals and Group II metals of the Periodic Table.

8. The method in accordance with claim 7 in which the metal salt is sodium acetate.

9. The method in accordance with claim 1 in which the metal salt is ammonium acetate.

* * * * *